US009971161B2

(12) United States Patent
Chen et al.

(10) Patent No.: US 9,971,161 B2
(45) Date of Patent: May 15, 2018

(54) DEVICE FOR ELECTROMAGNETIC WAVE CLOAKING

(71) Applicant: Zhejiang University, Hangzhou, Zhejiang (CN)

(72) Inventors: Hongsheng Chen, Hangzhou (CN); Bin Zheng, Hangzhou (CN); Baile Zhang, Singapore (SG)

(73) Assignee: ZHEJIANG UNIVERSITY, Hangzhou, Zhejiang (CN)

( * ) Notice: Subject to any disclaimer, the term of this patent is extended or adjusted under 35 U.S.C. 154(b) by 283 days.

(21) Appl. No.: 14/428,643

(22) PCT Filed: Mar. 10, 2013

(86) PCT No.: PCT/CN2013/072376
§ 371 (c)(1),
(2) Date: Mar. 17, 2015

(87) PCT Pub. No.: WO2014/139067
PCT Pub. Date: Sep. 18, 2014

(65) Prior Publication Data
US 2015/0248013 A1 Sep. 3, 2015

(51) Int. Cl.

| | |
|---|---|
| ***G02B 27/12*** | (2006.01) |
| ***H01Q 15/08*** | (2006.01) |
| ***F41H 3/00*** | (2006.01) |
| ***G02B 5/04*** | (2006.01) |
| ***G02B 5/06*** | (2006.01) |
| ***G21K 1/06*** | (2006.01) |
| ***G02B 17/02*** | (2006.01) |
| ***G02B 17/04*** | (2006.01) |

(52) U.S. Cl.
CPC ............. *G02B 27/126* (2013.01); *F41H 3/00* (2013.01); *G02B 5/045* (2013.01); *G02B 5/06* (2013.01); *G02B 17/023* (2013.01); *G02B 17/04* (2013.01); *G21K 1/06* (2013.01); *H01Q 15/08* (2013.01)

(58) Field of Classification Search
CPC ........ G02B 1/002; G02B 1/007; G02B 5/045; G02B 5/06; G02B 17/023; G02B 17/04; G02B 27/126; G21K 1/06; G21K 1/067; F41H 3/00; H01Q 15/08
USPC .......... 359/618, 625, 831–837; 427/457–484
See application file for complete search history.

(56) References Cited

U.S. PATENT DOCUMENTS 9,405,118 B1 * 8/2016 Lu .......................... G02B 27/00
2007/0229963 A1 * 10/2007 Momoki ............ G02B 27/1026 359/634
2011/0085229 A1 * 4/2011 Lavrentovich ............ G02F 1/29 359/315

FOREIGN PATENT DOCUMENTS

CN 102436022 A * 5/2012 ............... G02B 6/00

* cited by examiner

*Primary Examiner* — Ricky Mack
*Assistant Examiner* — Gary O'Neill
(74) *Attorney, Agent, or Firm* — Han IP Corporation

(57) ABSTRACT

An electromagnetic wave cloaking device is described. The device may include a plurality of first-type dielectric units, a plurality of second-type dielectric units, and a plurality of four kinds of spacers. The dielectric units and the spacers are arranged such that an electromagnetic wave incident into the cloaking device can be refracted within the device and around a cloaking area surrounded by the device.

20 Claims, 6 Drawing Sheets

DEVICE FOR ELECTROMAGNETIC WAVE CLOAKING

CROSS-REFERENCE TO RELATED APPLICATION

This application is the U.S. national stage application of International Application No. PCT/CN2013/072376, filed on Mar. 10, 2013. The above-identified patent application is hereby incorporated by reference in its entirety.

TECHNICAL FIELD

Implementations of the present disclosure are generally related to stealth technology and, more particularly, to stealth technology using electromagnetic cloaking.

BACKGROUND

Human invisibility is a long-pursued dream that has not yet been completely achieved. Electromagnetic waves refer to radiation whose electric and magnetic field components oscillate in phase, perpendicular to each other, and also perpendicular to the direction of energy propagation of the radiation. The spectrum of electromagnetic waves can comprise all frequencies of electromagnetic radiation including, from low frequency to high frequency, radio, microwave, infrared, visible light, ultraviolet, X-rays and gamma rays. In other words, the spectrum of electromagnetic radiation is infinite and continuous. Generally, incident electromagnetic waves cannot completely penetrate an object they strike; instead, they would at least be partially scattered by the surface of the object. Consequently, a shadow is formed behind the object, creating an area that is not detectable by the incident electromagnetic waves.

An ideal electromagnetic cloaking technology is to guide the incident electromagnetic waves around the object such that the electromagnetic waves would emerge from the other side of the object following their original incident paths without creating behind the object a shadow area where the electromagnetic waves would be blocked. This is as if the object were not irradiated by the electromagnetic waves, or, equivalently, as if the object did not exist, resulting in an ideal cloaking of the object.

One of the current stealth technologies employs painting absorbing materials on surfaces of an object, seeking to minimize reflection of incident electromagnetic waves and thus making the object less detectable. However, this approach does not achieve true invisibility. It works in the microwave frequency range and is effective only for monostatic radars, whereas for bistatic radars or multistatic radars the object can be easily detected.

For visible light frequency range, disruptive patterns are the stealth strategy commonly used; nevertheless, since one pattern cannot be equally effective for all kinds of surroundings, it is just a camouflage rather than a true stealth technology.

In another stealth approach, cameras and displays are employed to mirror the image taken from one side of the object to the other side of the object. The effectiveness of this approach is limited by the quality of the images. Moreover, extra equipment and resources are needed, and the cameras and the associated electrical wires may be visible. Thus this approach does not achieve true cloaking either.

In yet another cloaking approach, optical fibers are utilized as waveguides to direct the incident light from one side of the object to the other side, bypassing the object. This approach requires a large quantity of high quality optical fibers, and can only achieve cloaking in one direction.

In view of their respective limitations, none of the approaches discussed above is considered a candidate for an ideal cloaking technology. As stated earlier, an ideal electromagnetic cloaking technology would guide the incident electromagnetic waves around the object-to-be-hidden such that the electromagnetic waves would emerge from the other side of the object following their incident paths as if they were not blocked by the object, thus creating no shadow area behind the object.

In 2006, J. B. Pendry, Professor at Imperial College London, and his colleagues came up with a method to achieve ideal cloaking. Through a method of coordinate transformation, a cloaking device exhibiting spatially variant permittivity and permeability was designed. Experimental verification of the design was performed in microwave frequencies with metamaterials, composed of inhomogeneous and anisotropic artificial media constructed by metal arrays.

Due to construction complexity of the metal arrays, which would be ever more difficult to implement when applied to a smaller scale, and also due to the intrinsic high loss of metal in the visible light frequency range, the device is practical and effective only in microwave or far infrared frequency ranges. In the experimental verification by Pendry et al., many approximations were made and therefore the device did not achieve the goal of total invisibility, even though it did reduce the scattering cross section area by 24 percent. Nevertheless, the device was still deemed an effective cloaking device because it reduced the shadowed area behind the object to certain degree. In practical engineering, it is hard to remove the shadow area completely because of various non-idealities in the real world.

For all practical purposes, if a cloaking device would cause the shadow behind the irradiated object to reduce, or, equivalently, cause the projected area of the shadow onto a plane perpendicular to the incident wave to decrease, then the cloaking device is considered to be effective. Generally, scientists evaluate the effectiveness of a cloaking device by looking at how much reduction it can achieve in the size of the shadow area behind the irradiated object.

The constitutive parameters obtained through Pendry's method are often inhomogeneous, and include extreme values varying from 0 to infinite, imposing critical criteria to the material used, and also resulting in expensive and difficult realization of the cloaking device. Meanwhile, the material would exhibit a strong dispersion, making the device only workable in a narrow frequency range. Moreover, the device is effective only for electromagnetic waves in certain polarizations, greatly limiting its practical application.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide new approaches and techniques of designing and realizing an electromagnetic wave cloaking device to overcome, at least partially, some drawbacks of existing electromagnetic cloaking technologies.

The spectrum of the electromagnetic waves covered by the present disclosure comprises all frequencies of electromagnetic radiation, including, from low frequency to high frequency, radio waves, microwaves, infrared radiation, visible light, ultraviolet radiation, X-rays and gamma rays. The spectrum of electromagnetic radiation is infinite and continuous. The refractive index of a medium is a dimensionless number that describes how electromagnetic waves propagate through the medium as compared to through the vacuum, and is defined as the ratio of electromagnetic propagation velocity in vacuum and the electromagnetic propagation velocity in the medium. When electromagnetic waves propagate through two media of different refractive indexes, there will be refraction at the interface.

The present disclosure comprises six first-type dielectric units and six second-type dielectric units, wherein the first-type dielectric units and the second-type dielectric units are transparent to incident electromagnetic waves, the refractive index of the first-type dielectric units is greater than that of the second-type dielectric units, each of the first-type dielectric units is a prism with a cross section of in the shape of an isosceles triangle, and each of the second-type dielectric units is a prism with a cross section in the shape of either an isosceles triangle or an isosceles trapezoid.

The vertex angle of the cross section of a first-type dielectric unit is a first vertex angle, the equal sides of the cross section of the first-type dielectric unit are first legs, the base side of the cross section of the first-type dielectric unit is a first base, a sidewall of the first-type dielectric unit on which a first leg first-type dielectric is located is a first sidewall, and a sidewall of the first-type dielectric unit on which a first base first-type dielectric is located is a third sidewall.

In the case where the cross section of a second-type dielectric unit is in the shape of an isosceles triangle, the vertex angle of the cross section of the second-type dielectric unit is a second vertex angle, the equal sides of the cross section of the second-type dielectric unit are second legs, the base side of the cross section of the second-type dielectric unit is a second base, a sidewall of the second-type dielectric unit on which a second leg second-type dielectric is located is a second sidewall, and a sidewall of the second-type dielectric unit on which a second base second-type dielectric is located is a fourth sidewall.

In the case where the cross section of a second-type dielectric unit is in the shape of an isosceles trapezoid, the angle between extensions of the two equal sides of the cross section of the second-type dielectric unit is a third angle, the equal sides of the cross section of the second-type dielectric unit are third legs, the lower base of the cross section of the second-type dielectric unit is a third base, the upper base of the cross section of the second-type dielectric unit is a fourth base, a sidewall of the second-type dielectric unit on which a third leg second-type dielectric is located is a fifth sidewall, the sidewall of the second-type dielectric unit on which a third base second-type dielectric is located is a sixth sidewall, and the sidewall of the second-type dielectric unit on which a fourth base second-type dielectric is located is a seventh sidewall.

When the cross section of each of the second-type dielectric units is in the shape of an isosceles triangle, each second-type dielectric unit is arranged between two first-type dielectric units, adjacent second sidewalls and first sidewalls are opposed, each third sidewall faces a cloaking area, and each fourth sidewall faces a background dielectric.

When the cross section of each of the second-type dielectric units is in the shape of an isosceles triangle, if both the first-type dielectric unit and the second-type dielectric unit are solid, then the adjacent first sidewall and second sidewall can either touch each other directly or be separated by a second-kind spacer.

When the cross section of each of the second-type dielectric units is in the shape of an isosceles triangle, if the first-type dielectric units are solid and the second-type dielectric units are fluid, then each fourth sidewall is separated from the background dielectric by a first-kind spacer, and each of the top and bottom ends of each second-type dielectric unit is separated from the background dielectric by a fourth-kind spacer. In addition, the adjacent first sidewall and second sidewall can either touch each other directly or be separated by a second-kind spacer.

When the cross section of each of the second-type dielectric units is in the shape of an isosceles triangle, if the first-type dielectric units are fluid and the second-type dielectric units are solid, then each third sidewall is separated from the cloaking area by a third-kind spacer, and each of the top and bottom ends of each first-type dielectric unit is separated from the background dielectric by a fourth-kind spacer. In addition, the adjacent first sidewall and second sidewall can either touch each other directly or be separated by a second-kind spacer.

When the cross section of each of the second-type dielectric units are in the shape of an isosceles triangle, if both the first-type dielectric units and the second-type dielectric units are fluid, then the adjacent first sidewall and second sidewall are separated by a second-kind spacer, each fourth sidewall is separated from the background dielectric by a first-kind spacer, each third sidewall is separated from the cloaking area by a third-kind spacer, each of the top and bottom ends of each first-type dielectric unit is separated from the background dielectric by a fourth-kind spacer, and each of the top and bottom ends of each second-type dielectric unit is separated from the background dielectric by a fourth-kind spacer.

When the cross section of each of the second-type dielectric units is in the shape of an isosceles trapezoid, each second-type dielectric unit is arranged between two first-type dielectric units, adjacent fifth sidewalls and first sidewalls are opposed, each third sidewall as well as seventh sidewall faces a cloaking area, and each sixth sidewall faces a background dielectric.

When the cross section of each of the second-type dielectric units is in the shape of an isosceles trapezoid, if both the first-type dielectric units and the second-type dielectric units are solid, then the adjacent first sidewall and fifth sidewall can either touch each other directly or be separated by a second-kind spacer.

When the cross section of each of the second-type dielectric units is in the shape of an isosceles trapezoid, if the first-type dielectric units are solid and the second-type dielectric units are fluid, then each sixth sidewall is separated from the background dielectric by a first-kind spacer, each seventh sidewall is separated from the cloaking area by a third-kind spacer, and each of the top and bottom ends of each second-type dielectric unit is separated from the background dielectric by a fourth-kind spacer. In addition, the adjacent first sidewall and fifth sidewall can either touch each other directly or be separated by a second-kind spacer.

When the cross section of each of the second-type dielectric units is in the shape of an isosceles trapezoid, if the first-type dielectric units are fluid and the second-type dielectric units are solid, then each third sidewall is separated from the cloaking area by a third-kind spacer, and each of the top and bottom ends of each first-type dielectric unit is separated from the background dielectric by a fourth-kind spacer. In addition, the adjacent first sidewall and fifth sidewall can either touch each other directly or be separated by a second-kind spacer.

When the cross section of each of the second-type dielectric units is in the shape of an isosceles trapezoid, if both the first-type dielectric unit and the second-type dielectric units are fluid, then the adjacent first sidewall and fifth sidewall are separated by a second-kind spacer, each sixth sidewall is separated from the background dielectric by a first-kind spacer, each seventh sidewall is separated from the cloaking area by a third-kind spacer, each third sidewall is separated from the cloaking area by a third-kind spacer, each of the top and bottom ends of each first-type dielectric unit is separated from the background dielectric by a fourth-kind spacer, and each of the top and bottom ends of each second-type dielectric unit is separated from the background dielectric by a fourth-kind spacer.

The mentioned first, second and fourth-kind spacers are transparent to the incident electromagnetic waves. The refractive index of the first-kind spacer is greater than that of the second-type dielectric unit, and the refractive index of the second-kind spacer is greater than that of the second-type dielectric unit. The thickness of the first solid space, the thickness of the second-kind spacer and the length of the first base satisfy equation (1):

$$w_1+7.04\times w_2<2A \tag{1}$$

In equation (1), $w_1$ represents the thickness of the first-kind spacers and $w_2$ represents the thickness of the second-kind spacers while A represents the length of the first base.

Furthermore, the cloaking device is placed in the background dielectric, and the refractive index of the second-type dielectric unit and the background dielectric satisfy equation (2):

$$n_{BG}>n_{2nd}\geq n_{BG}/1.8 \tag{2}$$

In equation (2), $n_{BG}$ represents the refractive index of the background dielectric and $n_{2nd}$ represents the refractive index of the second-type dielectric units.

Furthermore, an electromagnetic wave beam, incident from the background dielectric to the cloaking device with an incident direction perpendicular to one of the third sidewalls, can pass through successively the adjacent second-type dielectric unit, first-type dielectric unit, second-type dielectric unit, first-type dielectric unit and second-type dielectric unit in sequence and transmit to the background dielectric. The emergent trace and the incident trace of the electromagnetic wave beam are aligned on the same straight line.

Furthermore, if the cross section of each of the second-type dielectric units is in the shape of an isosceles triangle, the refractive index of the first-type dielectric unit, the refractive index of the second-type dielectric unit, the refractive index of the background dielectric, the first vertex angle, the second vertex angle, the length of the first base and the length of the second base satisfy equations (3) to (8):

$$n_{1st}\sin\left(\arcsin\left(\frac{n_{2nd}\sin\left(60^\circ-\arcsin\left(\frac{n_{BG}\sin 30^\circ}{n_{2nd}}\right)-\alpha/2\right)}{n_{1st}}\right)+\alpha\right)= n_{2nd}\sin(30^\circ+\alpha/2) \tag{3}$$

-continued $$0^\circ<\alpha<2\arcsin\left(\frac{n_{BG}\sin 30^\circ}{n_{2nd}}\right)-60^\circ \tag{4}$$

$$\beta=60^\circ+\alpha \tag{5}$$

$$\frac{\sin(30^\circ+\alpha/2)}{\sin(\alpha/2)}=\frac{B}{A}\leq U\times V \tag{6}$$

where $$U=\frac{\sin\left[90^\circ-\arcsin\left(\frac{n_{2nd}\sin\left(\begin{matrix}60^\circ-\\ \arcsin\end{matrix}\left(\frac{n_{BG}\sin 30^\circ}{n_{2nd}}\right)-\alpha/2\right)}{n_{1st}}\right)-\alpha\right]}{\sin\left[90^\circ+\arcsin\left(\frac{n_{2nd}\sin\left(\begin{matrix}60^\circ-\\ \arcsin\end{matrix}\left(\frac{n_{BG}\sin 30^\circ}{n_{2nd}}\right)-\alpha/2\right)}{n_{1st}}\right)\right]} \tag{7}$$

$$V=\frac{\sin\left[30^\circ+\arcsin\left(\frac{n_{BG}\sin 30^\circ}{n_{2nd}}\right)+\alpha/2\right]}{2\sin(\alpha/2)\sin\left[90^\circ-\arcsin\left(\frac{n_{BG}\sin 30^\circ}{n_{2nd}}\right)\right]} \tag{8}$$

If the cross section of each of the second-type dielectric units is in the shape of an isosceles trapezoid, the refractive index of the first-type dielectric unit, the refractive index of the second-type dielectric unit, the refractive index of the background dielectric, the first vertex angle, the third angle, the length of the first base and the length of the third base satisfy equations (3), (4), (7), (8), (9) and (10):

$$\gamma=60^\circ+\alpha \tag{9}$$

$$\frac{\sin(30^\circ+\alpha/2)}{\sin(\alpha/2)}\leq\frac{C}{A}\leq U\times V \tag{10}$$

In the equations (3) to (10), $n_{1st}$ represents the refractive index of the first-type dielectric unit, $n_{2nd}$ represents the refractive index of the second-type dielectric unit, $n_{BG}$ represents the refractive index of the background dielectric, $\alpha$ represents the first vertex angle, $\beta$ represents the second vertex angle, $\gamma$ represents the third angle, A represents the length of the first base, B represents the length of the second base, and C represents the length of the third base.

The advantages of the present disclosure are stated as follow:

The present disclosure utilizes first-type dielectric units and second-type dielectric units to compose the cloaking device. When an electromagnetic wave beam propagates through the device, the trace of propagation is controlled by the different refractive indexes of the dielectric units. The electromagnetic wave beam, incident from the background dielectric to the cloaking device in a direction perpendicular to one of the third sidewalls, can pass through successively the adjacent second-type dielectric unit, first-type dielectric unit, second-type dielectric unit, first-type dielectric unit and second-type dielectric unit in sequence and transmit to the background dielectric. The emergent trace and the incident trace of the electromagnetic wave beam are aligned on the same straight line. The object inside the cloaking area is thus invisible to the wave beam because the wave beam does not enter the cloaking area. The present disclosure employs nature materials that can be easily acquired instead of metal arrays and is therefore easy to realize. The device controls the trace of the electromagnetic wave beam by using the first-type dielectric units and the second-type dielectric units, which are passive and require no power supply, resulting in more stable performance. The first-type dielectric units and the second-type dielectric units are isotropic, which is insensitive to the polarization direction of the electromagnetic waves, providing effective cloaking to electromagnetic waves in all polarization directions. This is especially important for applications in the visible light spectrum range because natural lights are incoherent and randomly polarized. The present disclosure provides effective cloaking in six directions and is applicable to the whole spectrum of electromagnetic wave frequencies.

Figure 1:
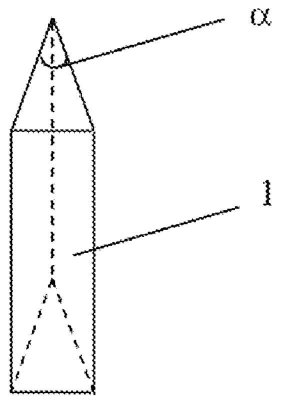
FIG. 1 is a perspective view of a first-type dielectric unit.

1 is the third sidewall of the first-type dielectric unit; a is the first vertex angle of the first-type dielectric unit; 2 is the fourth sidewall of the second-type dielectric unit; β is the second vertex angle of the second-type dielectric unit whose cross section is in the shape of an isosceles triangle; γ is the third angle of the second-type dielectric unit whose cross section is in the shape of an isosceles trapezoid; 3 is a first-type dielectric unit of the cloaking device; 4 is a first-type dielectric unit of the cloaking device; 5 is a first-type dielectric unit of the cloaking device; 6 is a first-type dielectric unit of the cloaking device; 7 is a first-type dielectric unit of the cloaking device; 8 is a first-type dielectric unit of the cloaking device; 9 is the cloaking area of the cloaking device; 10 is a second-type dielectric unit of the cloaking device; 11 is a second-type dielectric unit of the cloaking device; 12 is a second-type dielectric unit of the cloaking device; 13 is a second-type dielectric unit of the cloaking device; 14 is a second-type dielectric unit of the cloaking device; 15 is a second-type dielectric unit of the cloaking device; 16 is the area of the background dielectric; 17*a* is the trace of propagation of the incident electromagnetic wave beam in the background dielectric. 17*b* is the trace of propagation of the electromagnetic wave beam in the second-type dielectric unit. 17*c* is the trace of propagation of the electromagnetic wave beam in the first-type dielectric unit; 17*d* is the trace of propagation of the electromagnetic wave beam in the second-type dielectric unit; 17*e* is the trace of propagation of the electromagnetic wave beam in the first-type dielectric unit; 17*f* is the trace of propagation of the electromagnetic wave beam in the second-type dielectric unit; 17*g* is the trace of propagation of the emergent electromagnetic wave beam in the background dielectric; 18 is dielectric with a refractive index of $n_1$; 19 is a dielectric slab with a thickness of w and a refractive index of $n_x$; 20 is dielectric with a refractive index of $n_2$; 21*a* is the trace of propagation of the incident electromagnetic wave beam in the background dielectric; 21*b* is the trace of propagation of the electromagnetic wave beam in the second-type dielectric unit; 21*c* is the trace of propagation of the electromagnetic wave beam in the first-type dielectric unit; 21*d* is the trace of propagation of the electromagnetic wave beam in the second-type dielectric unit; 21*e* is the trace of propagation of the electromagnetic wave beam in the first-type dielectric unit; 21*f* is the trace of propagation of the electromagnetic wave beam in the second-type dielectric unit; 21*g* is the trace of propagation of the emergent electromagnetic wave beam in the background dielectric; 22 is a first-kind spacer of the cloaking device; 23 is a second-kind spacer of the cloaking device; 24 is a third-kind spacer of the cloaking device; 25 is a sixth sidewall of the second-type dielectric unit; 26 is a seventh sidewall of the second-type dielectric unit; 27 is a second-type dielectric unit of the cloaking device; 28 is a second-type dielectric unit of the cloaking device; 29 is a second-type dielectric unit of the cloaking device; 30*a* is the trace of propagation of the incident electromagnetic wave beam in the background dielectric; 30*b* is the trace of propagation of the electromagnetic wave beam in the second-type dielectric unit; 30*c* is the trace of propagation of the electromagnetic wave beam in the first-type dielectric unit; 30*d* is the trace of propagation of the electromagnetic wave beam in the second-type dielectric unit; 30*e* is the trace of propagation of the electromagnetic wave beam in the first-type dielectric unit; 30*f* is the trace of propagation of the electromagnetic wave beam in the second-type dielectric unit; 30*g* is the trace of propagation of the emergent electromagnetic wave beam in the background dielectric; 31*a* is the trace of propagation of the incident electromagnetic wave beam in the background dielectric; 31*b* is the trace of propagation of the electromagnetic wave beam in the second-type dielectric unit; 31*c* is the trace of propagation of the electromagnetic wave beam in the first-type dielectric unit; 31*d* is the trace of propagation of the electromagnetic wave beam in the second-type dielectric unit; 31*e* is the trace of propagation of the electromagnetic wave beam in the first-type dielectric unit; 31*f* is the trace of propagation of the electromagnetic wave beam in the second-type dielectric unit; 31*g* is the trace of propagation of the emergent electromagnetic wave beam in the background dielectric; 32 is a uncloaked object illuminated directly by the electromagnetic wave beams; 33 is the width of the shadow area projected onto a plane perpendicular to the incident direction of the electromagnetic wave beams that irradiate an uncloaked object; 34 is a fourth-kind spacer of the cloaking device; 35 is a second-type dielectric unit of the cloaking device; 36 is a second-type dielectric unit of the cloaking device; and 37 is a second-type dielectric unit of the cloaking device.

Moreover, in the figures:

$\theta_{1i}$ is the angle of incidence when the electromagnetic wave beam enters from the background dielectric 16 into the second-type dielectric unit 10; $\theta_{1t}$ is the angle of refraction when the electromagnetic wave beam enters from the background dielectric 16 into the second-type dielectric unit 10; $\theta_{2i}$ is the angle of incident when the electromagnetic wave beam enters from the second-type dielectric unit 10 into the first-type dielectric unit 3; $\theta_{2t}$ is the angle of refraction when the electromagnetic wave beam enters from the second-type dielectric unit 10 into the first-type dielectric unit 3; $\theta_{3i}$ is the angle of incidence when the electromagnetic wave beam enters from the first-type dielectric unit 3 into the second-type dielectric unit 11; $\theta_{3t}$ is the angle of refraction when the electromagnetic wave beam enters from the first-type dielectric unit 3 into the second-type dielectric unit 11;

Moreover, in the figures:

$\theta_1$ is the angle of incidence when the electromagnetic wave beam enters from the dielectric 18 with a refractive index of $n_1$ into the dielectric slab 19 with a refractive index of $n_x$; $\theta_{x1}$ is the angle of refraction when the electromagnetic wave beam enters from the dielectric 18 with a refractive index of $n_1$ into the dielectric slab 19 with a refractive index of $n_x$; $\theta_{x2}$ is the angle of incidence when the electromagnetic wave beam enters from the dielectric slab 19 with a refractive index of $n_x$ into the dielectric 20 with a refractive index of $n_2$; $\theta_2$ is the angle of refraction when the electromagnetic wave beam enters from the dielectric slab 19 with a refractive index of $n_x$ into the dielectric 20 with a refractive index of $n_2$; $\theta_2'$ is the angle of refraction when the electromagnetic wave beam enters from the dielectric 18 with a refractive index of $n_1$ into the dielectric 20 with a refractive index of $n_2$ instead of into the dielectric slab 19; w is the thickness of the dielectric slab 19; and d is the displacement of the refracted electromagnetic wave beam with or without the dielectric slab with a refractive index of $n_x$.

DETAILED DESCRIPTION OF PREFERRED IMPLEMENTATIONS

Example Implementations

Electromagnetic waves refer to radiation whose electric and magnetic field components oscillate in phase, perpendicular to each other, and also perpendicular to the direction of energy propagation of the radiation. The spectrum of electromagnetic waves can comprise all frequencies of electromagnetic radiation, including, from low frequency to high frequency, radio, microwave, infrared, visible light, ultraviolet, X-rays and gamma rays. The refractive index of a medium is a dimensionless number that describes how electromagnetic waves propagate through the medium as compared to through the vacuum, and is defined as the ratio of electromagnetic propagation velocity in vacuum and the electromagnetic propagation velocity in the medium. Fluids to which the present disclosure apply include liquids and gases.

FIG. 1 is a perspective view of a first-type dielectric unit, a prism whose cross section is in the shape of an isosceles triangle. As shown in FIG. 1, the vertex angle of the cross section of the first-type dielectric unit is a first vertex angle α, the equal sides of the cross section of the first-type dielectric unit are first legs, the base side of the cross section of the first-type dielectric unit is a first base, the sidewall of the first-type dielectric unit on which a first leg first-type dielectric is located is a first sidewall, and the sidewall of the first-type dielectric unit on which a first base first-type dielectric is located is a third sidewall 1.

Figure 2:
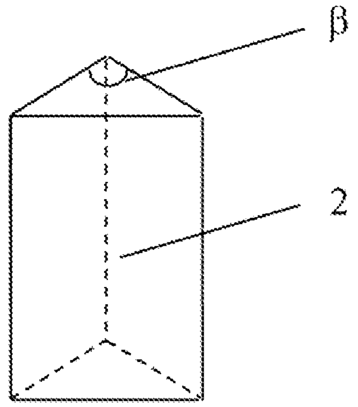
FIG. 2 is a perspective view of a second-type dielectric unit where the cross section is in the shape of an isosceles triangle.

FIG. 2 is a perspective view of a second-type dielectric unit, a prism whose cross section is in the shape of an isosceles triangle. As shown in FIG. 2, the vertex angle of the cross section of the second-type dielectric unit is a second vertex angle β, the equal sides of the cross section of the second-type dielectric unit are second legs, the base side of the cross section of the second-type dielectric unit is a second base, the sidewall of the second-type dielectric unit on which a second leg second-type dielectric is located is a second sidewall, and the sidewall of the second-type dielectric unit on which a second base second-type dielectric is located is a fourth sidewall 2.

Figure 3:
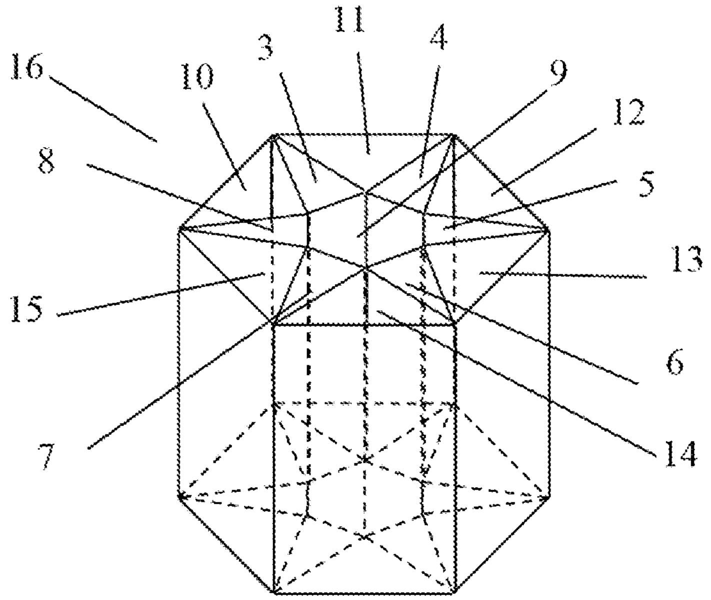
FIG. 3 is a perspective view of a first embodiment of the cloaking device, where the cross section of the second-type dielectric unit is in the shape of an isosceles triangle and solid spacers are not present.

FIG. 3 is a perspective view of an embodiment of the present disclosure. It is composed of six first-type dielectric units and six second-type dielectric units, wherein the first-type dielectric units and the second-type dielectric units are transparent to incident electromagnetic waves. Both the first-type dielectric units and the second-type dielectric units are solid. As shown in FIG. 3, the cross sections of the six first-type dielectric units 3, 4, 5, 6, 7 and 8 are in the shape of an isosceles triangle. The first-type dielectric units 3, 4, 5, 6, 7 and 8 are successively arranged clockwise to enclose a cloaking area 9 and each third sidewall 1 faces the cloaking area 9. The cross sections of the six second-type dielectric units 10, 11, 12, 13, 14 and 15 are in the shape of an isosceles triangle. Each second-type dielectric unit is arranged between two first-type dielectric units, and adjacent second sidewalls and first sidewalls are opposed and contact with each other. Each fourth sidewall 2 faces the background dielectric 16. Specifically, the second-type dielectric unit 10 is arranged between the first-type dielectric unit 3 and the first-type dielectric unit 8 while the second-type dielectric units 11, 12, 13, 14 and 15 are successively arranged clockwise between the two corresponding adjacent first-type dielectric units.

More specifically, as shown in FIG. 3, the six first-type dielectric units enclose a cloaking area 9, the second-type dielectric unit 10 is arranged between the first-type dielectric unit 3 and the first-type dielectric unit 8, and the second-type dielectric unit 11 is arranged between the first-type dielectric unit 4 and the first-type dielectric unit 3. In the same way, the second-type dielectric units 12, 13, 14, 15 are successively arranged clockwise between the two corresponding adjacent first-type dielectric units. Thus, the first-type dielectric unit 3, the second-type dielectric unit 11, the first-type dielectric unit 4, the second-type dielectric unit 12, the first-type dielectric unit 5, the second-type dielectric unit 13, the first-type dielectric unit 6, the second-type dielectric unit 14, the first-type dielectric unit 7, the second-type dielectric unit 15, the first-type dielectric unit 8 and the second-type dielectric unit 10 are successively adjacent and arranged clockwise to form one example of the cloaking device. In result, the fourth sidewalls 2 of the six second-type dielectric units face the background dielectric 16 while the third sidewalls 1 face the cloaking area 9.

When an electromagnetic wave propagates through two adjacent media with different refractive indexes, there will be refraction at the interface. The direction of the refraction is related to the refractive indexes of the two media governed by Snell's law: $n_1 \sin \theta_1 = n_2 \sin \theta_2$, where $n_1$ and $n_2$ are the refractive indexes of the incident and refraction media while $\theta_1$ and $\theta_2$ are the angle of incidence and angle of refraction, respectively. The more the difference between the refractive indexes of the two media, the larger the change there will be between the incident trace and the refraction trace of the electromagnetic wave. The refraction of the electromagnetic wave at the interface of anisotropic media is related to the polarization direction of the incident electromagnetic wave. As the first-type dielectric units and the second-type dielectric units of the cloaking device employ isotropic rather than anisotropic media, the refraction of the electromagnetic wave at the interface is insensitive to the polarization direction of the incident electromagnetic wave, and thus the cloaking effect of the cloaking device is insensitive to the polarization direction of the electromagnetic waves, resulting in effective cloaking to randomly polarized electromagnetic waves.

Figure 4:
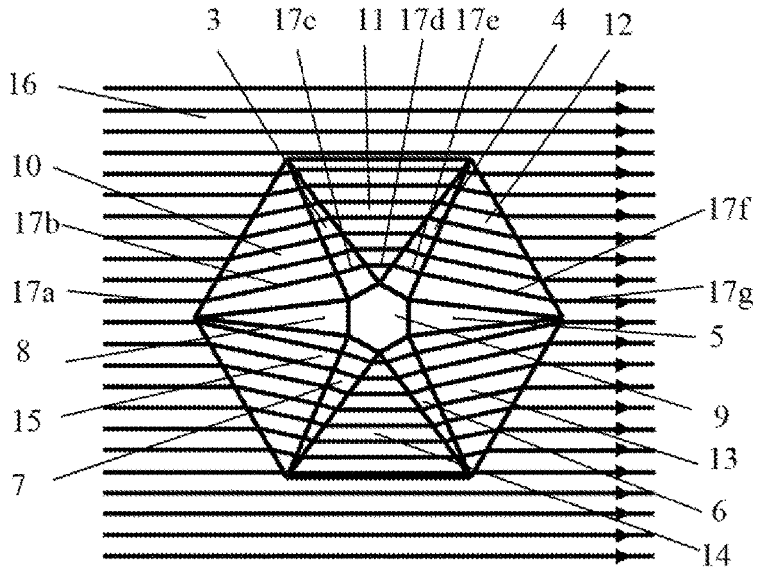
FIG. 4 is an illustration of the cloaking effect of the device, showing the propagation of electromagnetic wave beams through the cloaking device of FIG. 3.

Subsequently analyzed are the traces of propagation of the electromagnetic wave beams traveling through a cloaking device depicted in FIG. 3. As shown in FIG. 4, the electromagnetic wave beams that strike horizontally from the left to the right in the background dielectric 16 with a propagation direction perpendicular to the third sidewall 1 of the first-type dielectric unit 8. The propagation of the electromagnetic wave beams are represented in the figure by parallel lines. The lines represent the direction of the energy propagation, namely, the Poynting vectors, of the electromagnetic wave beams. The traces of propagation of the incident electromagnetic wave beams in the background dielectric 16 are perpendicular to the third sidewall 1 of the first-type dielectric unit 8. The electromagnetic wave beams coming into the cloaking device can be classified into three parts by the joint point of the second-type dielectric unit 10 and the second-type dielectric unit 15 shown in the figure: (1) beams incident above the joint point (classified as beams I), (2) beams incident below the joint point (classified as beams II) and (3) beams incident right at the joint point (classified as beams III). The propagation of the incident wave beams inside the cloaking device are represented by the parallel lines. Take beam 17 (composed of trace sections 17*a*, 17*b*, 17*c*, 17*d*, 17*e*, 17*f* and 17*g*) as an example, and the other beams parallel to the beam 17 can be analyzed in a similar way. 17*a* is the trace of propagation of an incident electromagnetic wave beam in the background dielectric 16, the beam incident in a direction perpendicular to the third sidewall 1 of the first-type dielectric unit 8. When the beam 17 arrives at the interface between the background dielectric 16 and the second-type dielectric unit 10, refraction happens and the beam is refracted onto the trace 17*b*. When the beam 17 arrives at the interface between the second-type dielectric unit 10 and the first-type dielectric unit 3, refraction happens again and the beam is refracted onto the trace 17*c*. When the beam 17 arrives at the interface between the first-type dielectric unit 3 and the second-type dielectric unit 11, the beam is refracted for the third time onto the trace 17*d*. The trace of the 17*d* is parallel to the trace of 17*a* but with a displacement. When the beam 17 arrives at the interface between the second-type dielectric unit 11 and the first-type dielectric unit 4, it is refracted onto the trace 17*e*. When the beam 17 arrives the interface of the first-type dielectric unit 4 and the second-type dielectric unit 12, it is again refracted and continues onto the trace 17*f*. When the beam 17 finally arrives at the interface between the second-type dielectric unit 12 and the background dielectric 16, it is refracted for the sixth and the last time onto the trace 17*g*. The trace 17*g* and the trace 17*a* are in the same direction and aligned on the same straight line. Due to the fact that the incident traces of the other beams in beams I are parallel to the incident trace of beam 17, for each beam of beams I, the incoming trace and the emergent trace are also aligned on a straight line.

Next to be analyzed with FIG. 4 are traces of the beams I whose incident direction from the background dielectric 16 is perpendicular to the third sidewall 1 of the first-type dielectric unit 8, the beams passing through successively the adjacent second-type dielectric unit 10, first-type dielectric unit 3, second-type dielectric unit 11, first-type dielectric 4, and second-type dielectric unit 12 in sequence and exiting into the background dielectric 16. Because of the physical symmetry, it is obviously that the traces of the beams II, whose incident traces are below the joint point, will pass in a similar manner through successively the adjacent second-type dielectric unit 15, first-type dielectric unit 7, second-type dielectric unit 14, first-type dielectric 6 and second-type dielectric unit 13 in sequence and exit into the background dielectric 16 with the emergent traces aligned with the incident trances. Thus, the incident electromagnetic wave beams will bypass the cloaking area 9 and return to the origin path, making any object inside the cloaking area 9 invisible.

For the beams III that comes right at the joint point, since the joint point of the second-type dielectric unit 10 and the second-type dielectric unit 15 is a singular point with infinitesimal area size, the power of the incident electromagnetic wave beams received at the singular point is zero, and therefore the joint point does not impact the cloaking effect of the cloaking device. In brief, FIG. 4 illustrates that the entire beams irradiating the cloaking device will bypass the cloaking area 9 in multiple refractions while keeping the incident and emergent traces along the same straight lines. Any object within the cloaking area 9 is therefore invisible to the incident beams, which results in effective cloaking.

Figure 5:
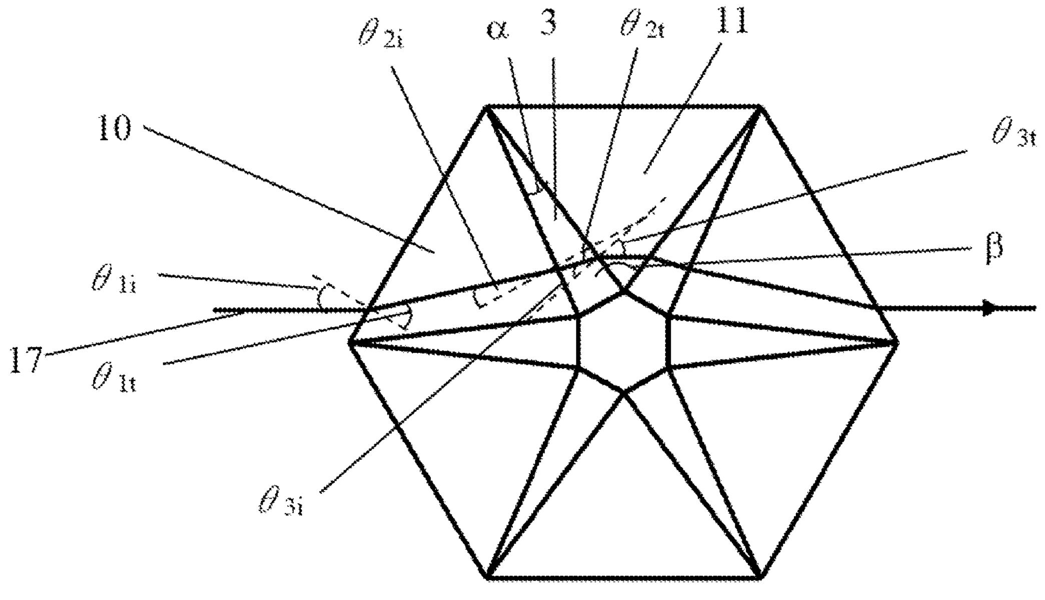
FIG. 5 is an illustration of the trace of propagation of an electromagnetic wave beam traveling through the cloaking device of FIG. 3.

With the aid of FIG. 5, analyzed next is the relation between the structural parameters of the cloaking device and the refractive indexes of each dielectric unit. Let the refractive index of each first-type dielectric unit be $n_{1st}$, the refractive index of each second-type dielectric units $n_{2nd}$, the refractive index of the background dielectric $n_{BG}$, the first vertex angle of each first-type dielectric unit α, the second vertex angle of each second-type dielectric unit β, the length of each first base A, and the length of each second base B. As shown in FIG. 5, an electromagnetic wave beam strikes horizontally from the background dielectric 16, whose direction of propagation is perpendicular to the third sidewall 1 of the first-type dielectric unit 8. When the beam 17 arrives at the interface between the background dielectric 16 and the second-type dielectric unit 10 with an angle of incidence $\theta_{1i}=30°$ the beam is refracted with an angle of refraction $\theta_{1t}$ following Snell's law, and thus $n_{BG} \sin 30° = n_{2nd} \sin \theta_{1t}$. When the beam 17 arrives at the interface between the second-type dielectric unit 10 and the first-type dielectric unit 3 with an angle of incidence $\theta_{2i}=60°-\theta_{1t}-\alpha/2$, the beam is refracted again with an angle of refraction $\theta_{2t}$ following Snell's law, and thus $n_{2nd} \sin(60°-\theta_{1t}-\alpha/2) = n_{1st} \sin \theta_{2t}$. When the beam 17 arrives at the interface between the first-type dielectric unit 3 and the second-type dielectric unit

11 with an angle of incidence $\theta_{3i}=\theta_{2t}+\alpha$, the beam is refracted for the third time with an angle of refraction $\theta_{3t}=30°+\alpha/2$ following Snell's law, and thus $n_{1st}\sin(\theta_{2t}+\alpha)=n_{2nd}\sin(30°+\alpha/2)$. Combining all the equations above, it follows that $$n_{1st}\sin\left(\arcsin\left(\frac{n_{2nd}\sin\left(60°-\arcsin\left(\frac{n_{BG}\sin 30°}{n_{2nd}}\right)-\alpha/2\right)}{n_{1st}}\right)+\alpha\right)=n_{2nd}\sin(30°+\alpha/2)$$

Besides, the base angle of the isosceles triangle of the cross section of each second-type dielectric unit is $$90°-\frac{\beta}{2}.$$

The geometry dictates that $$\left(90°-\frac{\beta}{2}\right)\times 2+\alpha=120°,$$

and thus $\beta=60°+\alpha$. In addition, in order to guarantee the beam can traverse second-type dielectric the interface between the second-type dielectric unit 10 and the first-type dielectric unit 3 from the side of the second-type dielectric unit 10 to the side of the first-type dielectric unit 3, it is required that $$\alpha<2\arcsin\left(\frac{n_{BG}\sin 30°}{n_{2nd}}\right)-60°.$$

Similarly, to guarantee the beam can traverse first-type dielectric the interface between the first-type dielectric unit 3 and the second-type dielectric unit 11 from the side of the first-type dielectric unit 3 to the side of the second-type dielectric unit 11, it is required that $$\frac{\sin(30°+\alpha/2)}{\sin(\alpha/2)}=\frac{B}{A}\leq U\times V,$$

where $$U=\frac{\sin\left[90°-\arcsin\left(\frac{n_{2nd}\sin\left(60°-\arcsin\left(\frac{n_{BG}\sin 30°}{n_{2nd}}\right)-\alpha/2\right)}{n_{1st}}\right)-\alpha\right]}{\sin\left[90°+\arcsin\left(\frac{n_{2nd}\sin\left(60°-\arcsin\left(\frac{n_{BG}\sin 30°}{n_{2nd}}\right)-\alpha/2\right)}{n_{1st}}\right)\right]}$$

$$V=\frac{\sin\left[30°+\arcsin\left(\frac{n_{BG}\sin 30°}{n_{2nd}}\right)+\alpha/2\right]}{2\sin(\alpha/2)\sin\left[90°-\arcsin\left(\frac{n_{BG}\sin 30°}{n_{2nd}}\right)\right]}$$

When the refractive index of the background dielectric is $n_{BG}=1.33$, the refractive index of the second-type dielectric unit is $n_{2nd}=1$, and the first vertex angle of the first-type dielectric unit is $\alpha=13°$, it can be resulted that $\beta=73°$ and the refractive index of the first-type dielectric unit is $n_{1st}=1.78$. In practical applications, to design a cloaking device suitable for a specific background dielectric exhibiting a certain refractive index, one can choose proper values for the parameters above to satisfy the governing equations.

Figure 6:
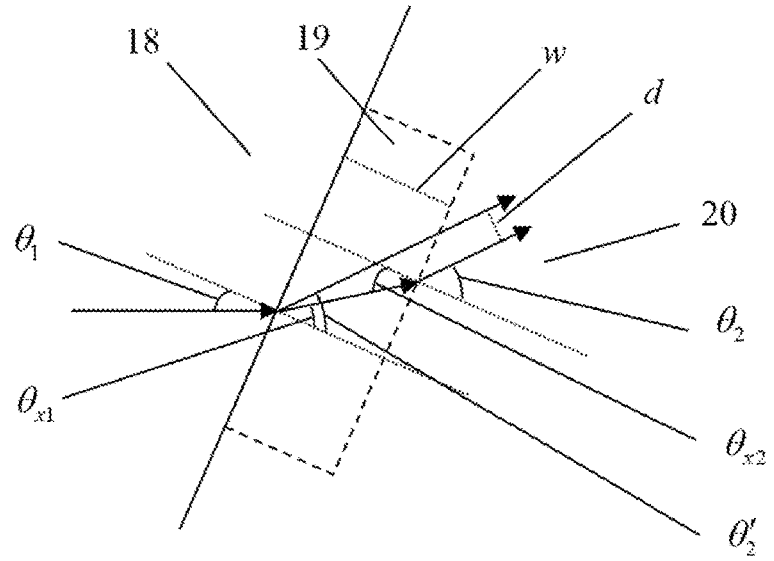
FIG. 6 is an illustration of refraction of an electromagnetic wave beam traveling through a dielectric slab.

FIG. 6 shows the situation where an electromagnetic wave beam propagates from dielectric 18 with a refractive index of $n_1$ into a dielectric slab 19 with a refractive index of $n_x$ and a thickness of w, and then exits the dielectric slab 19 and transmits into dielectric 20 with a refractive index of $n_2$. Governed by Snell's law, the propagation fulfills $n_1\sin\theta_1=n_x\sin\theta_{x1}$ and $n_x\sin\theta_{x2}=n_2\sin\theta_2$. Specifically, $\theta_1$ is the angle of incidence when the electromagnetic wave beam arrives at the interface between the dielectric 18 and the dielectric slab 19, and is $\theta_{x1}$ the angle of refraction when the electromagnetic wave beam is refracted at the interface. Similarly, $\theta_{x2}$ is the angle of incidence when the electromagnetic wave beam arrives at the interface between the dielectric slab 19 and the dielectric 20, and $\theta_2$ is the angle of refraction when the electromagnetic wave beam is refracted at the interface. Due to the parallel surfaces of the dielectric slab 19, it follows that $\theta_{x1}=\theta_{x2}$, and thus $n_1\sin\theta_1=n_2\sin\theta_2$. Also shown in FIG. 6 is the refracted trace of the electromagnetic wave beam in absence of the dielectric slab 19; specifically, $\theta_2'$; is the angle of refraction in this scenario, and Snell's law dictates that $n_1\sin\theta_1=n_2\sin\theta_2'$. Comparing the equations of the two scenarios (with and without the dielectric slab 19), one finds that $\theta_2'=\theta_2$. Namely, the direction of the emergent beam stays the same regardless of the existence of the dielectric slab 19, with only a displacement in the scenario of the dielectric slab 19, which can be calculated from FIG. 6 as $$|d|=\left|w\cdot\left(\tan\theta_2-\tan\left(\arcsin\left(\frac{n_1\sin\theta_1}{n_x}\right)\right)\right)\cdot\cos\theta_2\right|.$$

Figure 7:
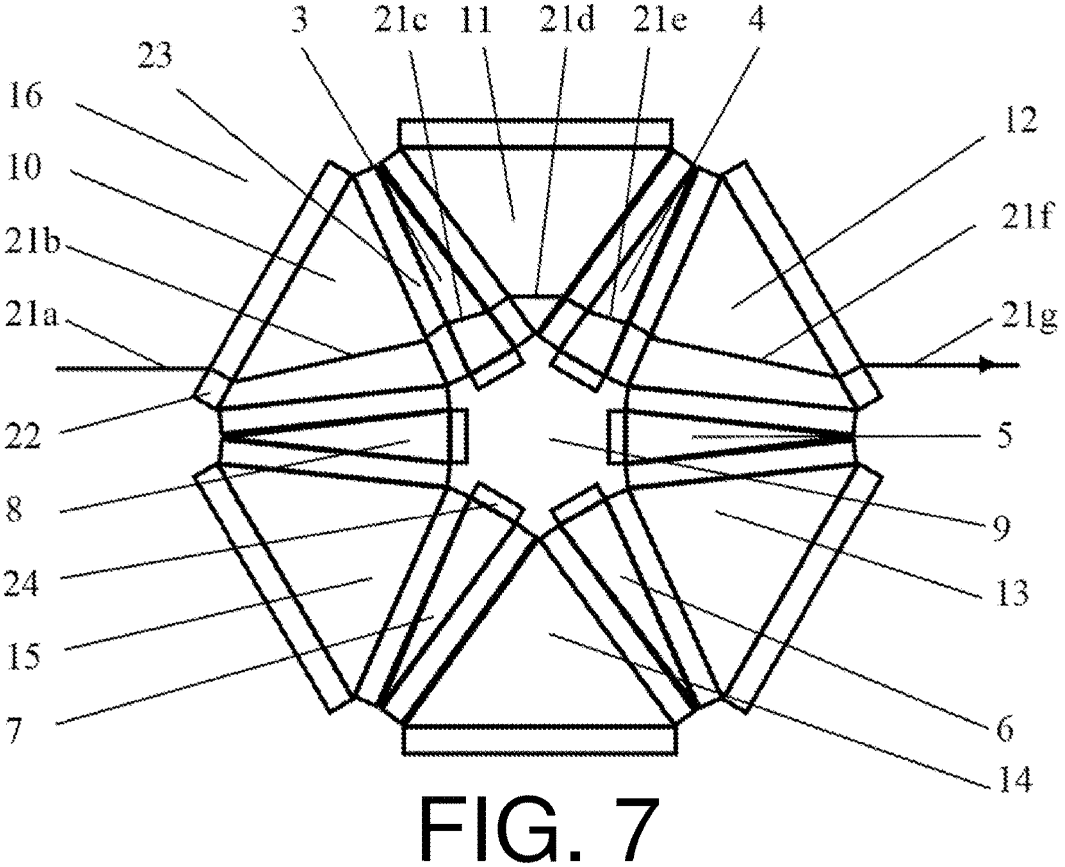
FIG. 7 is an illustration of the trace of propagation of an electromagnetic wave beam traveling through a second embodiment of the cloaking device, where the cross section of the second-type dielectric units is in the shape of an isosceles triangle and solid spacers are present.
Figure 12:
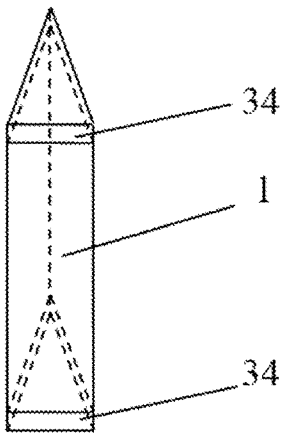
FIG. 12 is a perspective view showing the positional relation between fourth-kind spacers and the top and bottom ends of a first-type dielectric unit.
Figure 13:
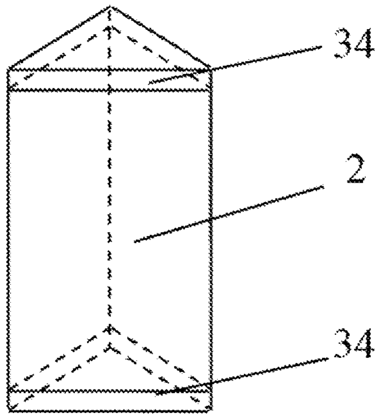
FIG. 13 is a perspective view showing the positional relation between fourth-kind spacers and the top and bottom ends of a second-type dielectric unit whose cross section is in the shape of an isosceles triangle.

FIG. 7 illustrates another embodiment of the present disclosure. As shown in FIG. 7, the cross sections of the six first-type dielectric units 3, 4, 5, 6, 7 and 8 are in the shape of an isosceles triangle while each third sidewall 1 faces the cloaking area 9. The cross sections of the six second-type dielectric units 10, 11, 12, 13, 14 and 15 are in the shape of an isosceles triangle and each second-type dielectric unit is arranged between two first-type dielectric units while each fourth sidewall 2 faces the background dielectric 16. Each first sidewall is separated from the adjacent second sidewall by a second-kind spacer 23, and each fourth sidewall 2 is separated from the background dielectric 16 by a first-kind spacer 22, while each third sidewall 1 is separated from the cloaking area 9 by a third-kind spacer 24. In the case where both the first-type dielectric units and the second-type dielectric units are solid, the structure of a cloaking device according to the present disclosure would either be one as shown in FIGS. 3, 4 and 5, or one as shown in FIG. 7 but without the first-kind spacers 22 and the third-kind spacers 24. In the case where the first-type dielectric units are solid and the second-type dielectric units are fluid, then, as shown in FIG. 13, each of the top and bottom ends of the second-type dielectric units 10, 11, 12, 13, 14 and 15 is to be separated from the background dielectric 16 by a fourth-kind spacer 34. In this case, the structure of the cloaking device would either be one as shown in FIG. 7 but without the third-kind spacers 24, or one as shown in FIG. 7 but without the third-kind spacers 24 and also without the second-kind spacers 23 while the adjacent first sidewalls and second sidewalls contact each other. In the case where the first-type dielectric units are fluid and the second-type dielectric units are solid, then, as shown in FIG. 12, each of the top and bottom ends of the first-type dielectric units 3, 4, 5, 6, 7 and 8 is to be separated from the background dielectric 16 by a fourth-kind spacer 34. In this case, the structure of the cloaking device would either be one as shown in FIG. 7 but without the first-kind spacers 22, or one as shown in FIG. 7 but without the first-kind spacers 22 and also without the second-kind spacers 23 while the adjacent first sidewalls and second sidewalls contact each other. In the case where both the first-type dielectric units and the second-type dielectric units are fluid, then, as shown in FIG. 12 and FIG. 13, each of the top and bottom ends of the first-type dielectric units 3, 4, 5, 6, 7 and 8 is to be separated from the background dielectric 16 by a fourth-kind spacer 34, and each of the top and bottom ends of the second-type dielectric units 10, 11, 12, 13, 14 and 15 is to be separated from the background dielectric 16 by a fourth-kind spacer 34. In this case, the structure of the cloaking device is exactly as shown in FIG. 7.

By comparing the trace of propagation of beam 21 (composed of traces 21*a*, 21*b*, 21*c*, 21*d*, 21*f* and 21*g* in FIG. 7) where solid spacers are present and the trace of propagation of beam 17 (composed of traces 17*a*, 17*b*, 17*c*, 17*d*, 17*e*, 17*f* and 17*g* in FIG. 4) where solid spacers are not present, the influence of the solid spacers upon the cloaking effect of the present disclosure can be analyzed. Referring to FIG. 7, when the first-kind spacers 22, the second-kind spacers 23 and the third-kind spacers 24 all present, the cloaking effect would be mostly influenced. When the electromagnetic wave beam 21 propagates in a direction perpendicular to the third sidewall 1 of the first-type dielectric unit 8, the trace 21*a* in the background dielectric 16 depicted in FIG. 7 is the same as the trace 17*a* depicted in FIG. 4. When the beam 21 traverses from the background dielectric 16 to the second-type dielectric unit 10 after passing through a first-kind spacer 22, the direction of the trace 21*b* in FIG. 7 parallels the direction of the trace 17*b* in FIG. 4 where the solid spacer 22 is not present, second-type dielectric only with a displacement d1. Namely, the direction of the trace 21*b* and the trace 17*b* are the same, and the only difference between trace 21*b* and trace 17*b* is the displacement d1 between them, which is caused by the first-kind spacer 22 between the second-type dielectric unit 10 and the background dielectric 16. When the beam 21 traverses from the second-type dielectric unit 10 to the first-type dielectric unit 3 after passing through a second-kind spacer 23, the direction of the trace 21*c* in FIG. 7 parallels the direction of the trace 17*c* in FIG. 4 where the solid spacer 23 is not present, only with another displacement d2, which is caused by the second-kind spacer 23 between the second-type dielectric unit 10 and the first-type dielectric unit 3. When the beam 21 traverses from the first-type dielectric unit 3 to the second-type dielectric unit 11 after passing through another second-kind spacer 23, the direction of the trace 21*d* in FIG. 7 parallels the direction of the trace 17*d* in FIG. 4 where the solid spacer 23 is not present, only with yet another displacement d3, which is caused by the second-kind spacer 23 between the second-type dielectric unit 11 and the first-type dielectric unit 3. Due to the symmetry of the structure of the cloaking device as well as the reversed optical paths predicted by Fermat's principle, when the beam 21 traverses from the second-type dielectric unit 11 to the first-type dielectric unit 4 after passing through a second-kind spacer 23, the direction of the trace 21*e* in FIG. 7 would parallel the direction of the trace 17*e* in FIG. 4 where the solid spacer 23 is not present, and with a displacement—d3, which is caused by the second-kind spacer 23 between the second-type dielectric unit 11 and the first-type dielectric unit 4. Similarly, when the beam 21 traverses from the first-type dielectric unit 4 to the second-type dielectric unit 12 after passing through a second-kind spacer 23, the direction of the trace 21*f* in FIG. 7 would parallel the direction of the trace 17*f* in FIG. 4 where the solid spacer 23 is not present, and with an additional displacement—d2, which is caused by the second-kind spacer 23 between the second-type dielectric unit 12 and the first-type dielectric unit 4. When the beam 21 traverses from the second-type dielectric unit 12 to the background dielectric 16 after passing through a first-kind spacer 22, the direction of the trace 21*g* in FIG. 7 would parallel the direction of the trace 17*g* in FIG. 4, and with a displacement of—d1, which is caused by the first-kind spacer 22 between the second-type dielectric unit 12 and the background dielectric 16. In fact, the total sum of the displacements would be zero, and thus the trace 21*g* would completely overlap the trace 17*g*. Consequently, the beam 21 would start from the background dielectric 16, pass through the successively adjacent second-type dielectric unit 10, first-type dielectric unit 3, second-type dielectric unit 11, first-type dielectric 4 and second-type dielectric unit 12 in sequence, and finally transmit back to the background dielectric 16 while the trace 21*g* and the trace 21*a* are in the same direction and aligned on the same straight line.

Figure 11:
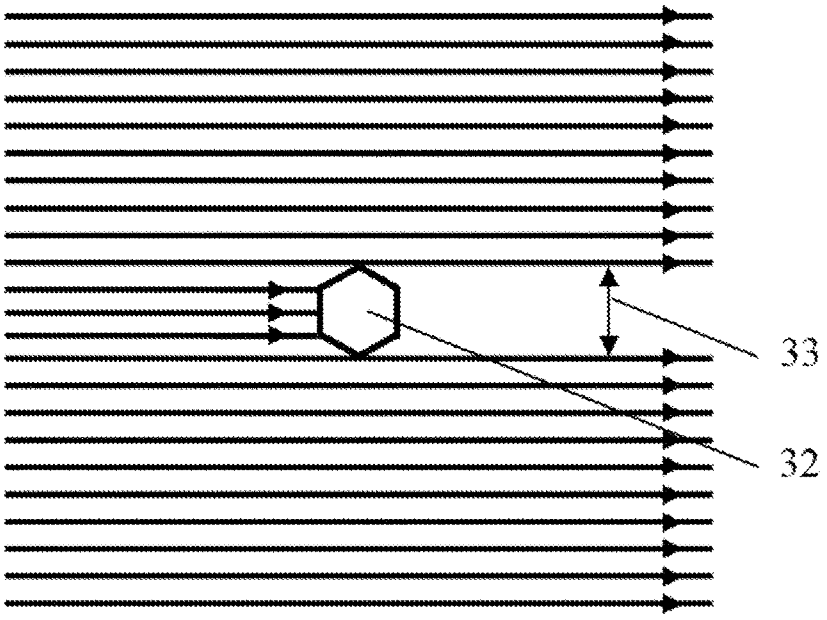
FIG. 11 is an illustration of the generation of the shadow area behind an uncloaked object irradiated by incident electromagnetic wave beams.

FIG. 11 is an illustration of the generation of the shadow area behind an uncloaked object 32 irradiated by incident electromagnetic wave beams. Suppose the object has the shape of a prism, with a regular hexagon cross section. The shadow behind the object is a rectangle when projected onto a plane perpendicular to the propagation direction of the incident electromagnetic wave beams. The area of the shadow can be quantitatively represented by the width 33 of the shadow. Alternatively, when the object is cloaked by a cloaking device, the width of the shadow would reduce, implying the reduction in size of the shadow area. The smaller the area of the shadow, the better the cloaking effect the device provides.

Unlike the case shown in FIG. 3 where the second-type dielectric unit 10 and the second-type dielectric unit 15 contact directly with each other and thus the joint area between the two dielectric units extending from the singular joint point is infinitesimal, the case shown in FIG. 7 has between the second-type dielectric unit 10 and the second-type dielectric unit 15 two second-kind spacers 23 with finite thickness, and thus beams incident from the background dielectric 16 into the second-kind spacers 23 between the second-type dielectric unit 10 and the second-type dielectric unit 15 will no longer follow the trace of beam 21, causing a shadow area behind the cloaking device and deteriorating its effectiveness. The deterioration can be evaluated by analyzing the relation between the size of the shadow area, which is represented by the size of its projection onto a plane perpendicular to the propagation direction of the incident electromagnetic wave beams, and the thickness of the first-kind spacers and the second-kind spacers of the cloaking device. Given that the first-kind spacers have a refractive index greater than that of the second-type dielectric units, and that the second-kind spacers have a refractive index greater than that of the second-type dielectric units, a relation exists among the following parameters: the maximum width of the projection of the shadow onto a plane perpendicular to the propagation direction of the incident electromagnetic wave beams L, the refractive index of the background dielectric $n_{BG}$, the refractive index of the first-type dielectric units $n_{1st}$, the refractive index of the second-type dielectric units $n_{2nd}$, the first vertex angle α, the thickness of the first-kind spacers w1 and the thickness of the second-kind spacers w2 satisfying the equation:

$$L=\begin{cases}2\times\left[w_1\cdot\sin\theta_{1i}+w_2\cdot\left(\cos(\alpha/2)+\tan\theta_{3t}\cdot\frac{\cos\theta_{3i}}{\cos\theta_{2t}}\cdot\frac{\cos\theta_{2i}}{\cos\theta_{1t}}\cdot\cos\theta_{1i}\right)\right]; & \theta_{2i}<0\\ 2\times\left[w_1\cdot\sin\theta_{1i}+w_2\cdot\left(\cos(\alpha/2)+\left(\tan\theta_{3i}\cdot\frac{\cos\theta_{3i}}{\cos\theta_{2i}}+\tan\theta_{2i}\right)\cdot\frac{\cos\theta_{2i}}{\cos\theta_{1t}}\cdot\cos\theta_{1i}\right)\right]; & \theta_{2i}>0\end{cases}$$

where, $$\theta_{1i}=30°;$$

$$\theta_{1t}=\arcsin\left(\frac{n_{BG}\sin 30°}{n_{2nd}}\right);$$

$$\theta_{2i}=60°-\theta_{1t}-\alpha/2;$$

$$\theta_{2t}=\arcsin\left(\frac{n_{2nd}\sin(60°-\theta_{1t}-\alpha/2)}{n_{1st}}\right);$$

$$\theta_{3i}=\theta_{2t}+\alpha;$$

$$\theta_{3t}=30°+\alpha/2;$$

From the equation, when the thickness of the first-kind spacers w1 and the thickness of the second-kind spacers w2 are fixed, the maximum width of shadow projection L is determined by the refractive index of the background dielectric $n_{BG}$, the refractive index of the first-type dielectric units $n_{1st}$, the refractive index of the second-type dielectric units $n_{2nd}$ and the first vertex angle α. Given that $n_{BG}>n_{2nd}\geq n_{BG}/1.8$ $n_{1st}>n_{2nd}$ and $$0°<\alpha<2\arcsin\left(\frac{n_{BG}\sin 30°}{n_{2nd}}\right)-60°,$$

it can be calculated that the maximum width of the shadow projection is $L=w_1+7.04\times w_2$. Let H be the width of the shadow projection from an uncloaked object that has the same dimension as the cloaking device, it follows that $H\geq 2A$, where A represents the length of the first base. Therefore, as long as $$\frac{L}{2A}<1$$

is satisfied, namely, as long as $w_1+7.04\times w_2<2A$, the cloaking device can always be effective in reducing the area of the shadow. That is to say, the width of the shadow L from the cloaking device is always smaller than the width of the shadow H from an uncloaked object having the same dimension as the cloaking device, proving that the device is always effective under the condition stated above.

According to the equation of the maximum width of the shadow projection L, the thinner the thicknesses of the first-kind spacers and the second-kind spacers, the smaller the maximum width of the shadow. In the case where either the first-type dielectric units or the second-kind spacer dielectric units are solid, the corresponding first or second-kind spacers are not needed. Moreover, in the case where both the first-type dielectric units and the second-type dielectric units are solid, the cloaking device contains no solid spacer, and thus the width of the shadow L is 0, achieving total cloaking.

Figure 8:
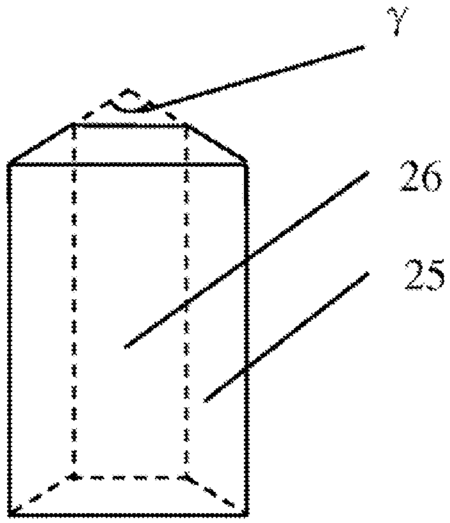
FIG. 8 is a perspective view of a second-type dielectric unit where the cross section is in the shape of an isosceles trapezoid.

FIG. 8 is a perspective view of another second-type dielectric unit of the present disclosure, which is a prism whose cross section is in the shape of an isosceles trapezoid.

Figure 9:
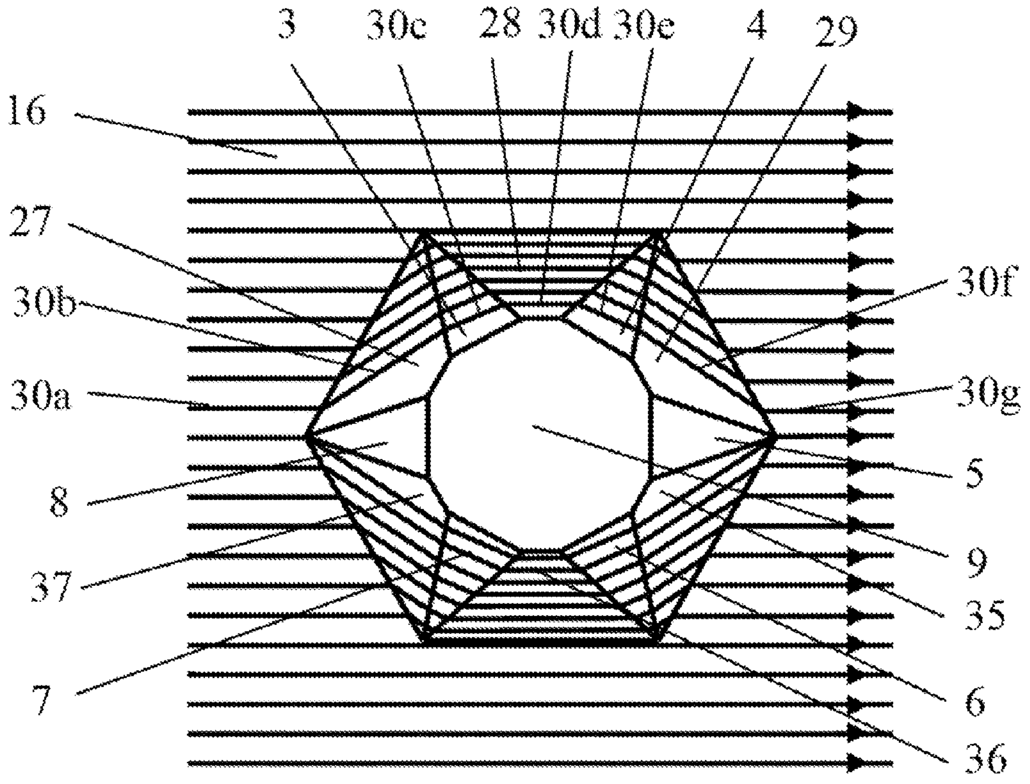
FIG. 9 is an illustration of a third embodiment of the cloaking device, where the cross section of the second-type dielectric units is in the shape of an isosceles trapezoid and solid spacers are not present.

FIG. 9 is an illustration of yet another embodiment of the cloaking device. As shown in FIG. 9, the cross sections of the six first-type dielectric units 3, 4, 5, 6, 7 and 8 are in the shape of an isosceles triangle. The first-type dielectric units 3, 4, 5, 6, 7 and 8 are successively arranged clockwise to enclose a cloaking area 9 and each third sidewall 1 faces the cloaking area 9. The cross sections of the six second-type dielectric units 27, 28, 29, 35, 36 and 37 are in the shape of an isosceles trapezoid. Each second-type dielectric unit is arranged between two first-type dielectric units, and adjacent fifth sidewalls and first sidewalls oppose and contact each other. Each sixth sidewall 25 faces the background dielectric 16 and each seventh sidewall 26 faces the cloaking area 9.

As shown in FIG. 9, the electromagnetic wave beam 30, incident from the background dielectric 16 in a direction perpendicular to the third sidewall 1 of the first-type dielectric unit 8, will pass through successively the adjacent second-type dielectric unit 27, first-type dielectric unit 3, second-type dielectric unit 28, first-type dielectric 4 and second-type dielectric unit 29 in sequence, and transmit to the background dielectric 16. The trace 30*g* and the trace 30*a* are in the same direction and aligned along the same straight line. In the same manner, all the other beams incident from the background dielectric 16 and parallel to the electromagnetic wave beam 30 will pass through successively adjacent dielectric units comprising a second-type dielectric unit, a first-type dielectric unit, another second-type dielectric unit, another first-type dielectric unit and yet another second-type dielectric unit in sequence and transmit to the background dielectric 16. In this way, the incident electromagnetic wave beams bypass the cloaking area 9 and return to their origin paths, making an object inside the cloaking area 9 invisible. Using Snell's law and following the same analysis used in FIG. 5, one finds a relation among the refractive index of the first-type dielectric units $n_{1st}$, the refractive index of the second-type dielectric units $n_{2nd}$, the refractive index of the background dielectric $n_{BG}$, the first vertex angle of the first-type dielectric units α and the third angle of the second-type dielectric units γ that satisfies the equation below:

$$n_{1st}\sin\left(\arcsin\left(\frac{n_{2nd}\sin\left(60^\circ-\arcsin\left(\frac{n_{BG}\sin 30^\circ}{n_{2nd}}\right)-\alpha/2\right)}{n_{1st}}\right)+\alpha\right)=n_{2nd}\sin(30^\circ+\alpha/2).$$

Furthermore, the lower base angle of the isosceles trapezoid of the cross section of the second-type dielectric units is $$90^\circ-\frac{\gamma}{2}.$$

Geometry of the structure dictates that $$\left(90^\circ-\frac{\gamma}{2}\right)\times 2+\alpha=120^\circ,$$

and thus $\gamma=60^\circ+\alpha$. In addition, in order to guarantee that the beams can traverse second-type dielectric the interface between the second-type dielectric unit 27 and the first-type dielectric unit 3 from the side of the second-type dielectric unit 27 to the side of the first-type dielectric unit 3 and further propagate to the interface between the first-type dielectric unit 3 and the second-type dielectric 28, it is required that $$\alpha<2\arcsin\left(\frac{n_{BG}\sin 30^\circ}{n_{2nd}}\right)-60^\circ$$

and $$\frac{\sin(30^\circ+\alpha/2)}{\sin(\alpha/2)}\leq\frac{C}{A}\leq U\times V,$$

where $$U=\frac{\sin\left[90^\circ-\arcsin\left(\frac{n_{2nd}\sin\left(60^\circ-\arcsin\left(\frac{n_{BG}\sin 30^\circ}{n_{2nd}}\right)-\alpha/2\right)}{n_{1st}}\right)-\alpha\right]}{\sin\left[90^\circ+\arcsin\left(\frac{n_{2nd}\sin\left(60^\circ-\arcsin\left(\frac{n_{BG}\sin 30^\circ}{n_{2nd}}\right)-\alpha/2\right)}{n_{1st}}\right)\right]}$$

$$V=\frac{\sin\left[30^\circ+\arcsin\left(\frac{n_{BG}\sin 30^\circ}{n_{2nd}}\right)+\alpha/2\right]}{2\sin(\alpha/2)\sin\left[90^\circ-\arcsin\left(\frac{n_{BG}\sin 30^\circ}{n_{2nd}}\right)\right]}$$

In the equations above, A represents the length of the first base and C represents the length of the third base while the length of the fourth base D can be calculated using $$D=C-\frac{\sin(30^\circ+\alpha/2)}{\sin(\alpha/2)}A.$$

It can be shown that when the last equation is satisfied, the fourth base D is always greater than or equal to zero. When D is equal to zero, the cross section of the second-type dielectric units is in the shape of an isosceles triangle.

Figure 10:
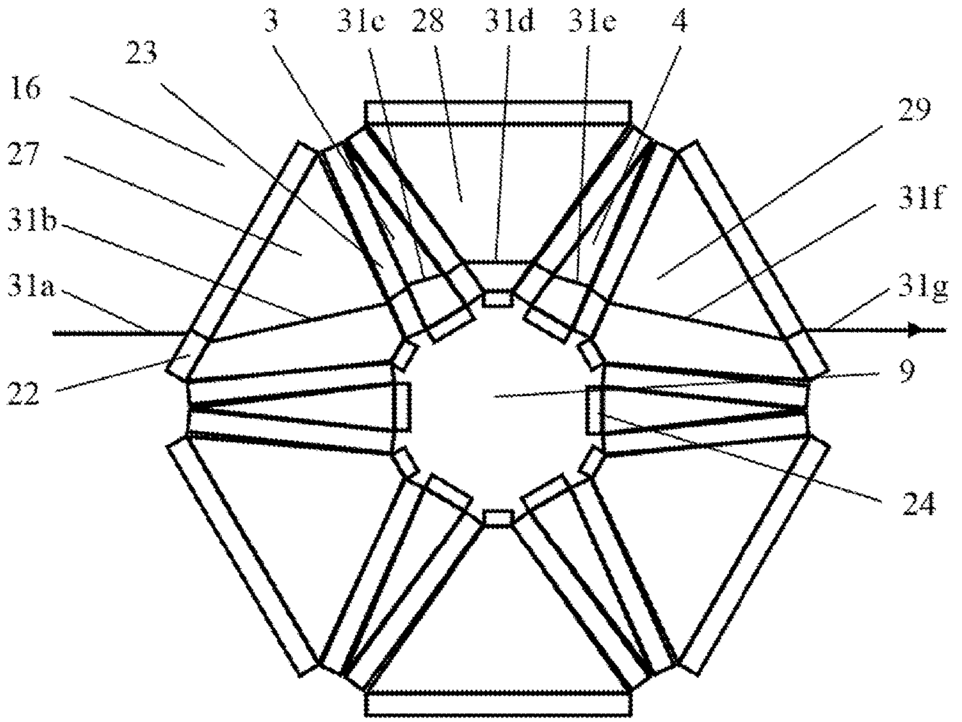
FIG. 10 is an illustration of the trace of propagation of an electromagnetic wave beam traveling through a fourth embodiment of the cloaking device, where the cross section of the second-type dielectric units is in the shape of an isosceles trapezoid and solid spacers are present.
Figure 14:
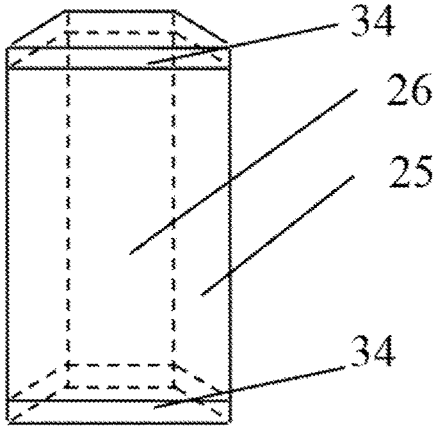
FIG. 14 is a perspective view showing the positional relation between fourth-kind spacers and the top and bottom ends of a second-type dielectric unit whose cross section is in the shape of an isosceles trapezoid.

FIG. 10 is an illustration of still another embodiment of the present disclosure. As shown in FIG. 10, the cross sections of the six first-type dielectric units 3, 4, 5, 6, 7 and 8 are in the shape of an isosceles triangle while each third sidewall 1 faces the cloaking area 9. The cross sections of the six second-type dielectric units 27, 28, 29, 35, 36 and 37 are in the shape of an isosceles trapezoid while each second-type dielectric unit is arranged between two first-type dielectric units. Each sixth sidewall 25 faces the background dielectric 16 and each seventh sidewall 26 faces the cloaking area 9. Each first sidewall is separated from the adjacent fifth sidewall by a second-kind spacer 23 while each sixth sidewall 25 is separated from the background dielectric 16 by a first-kind spacer 22. Each seventh sidewall 26 is separated from the cloaking area 9 by a third-kind spacer 24 while each third sidewall 1 is separated from the cloaking area 9 by a third-kind spacer 24. In the case where both the first-type dielectric units and the second-type dielectric units are solid, the structure of the cloaking device according to the present embodiment would either be one as shown in FIG. 9, or one as shown in FIG. 10 but without the first-kind spacers 22 and the third-kind spacers 24. In the case where the first-type dielectric units are solid and the second-type dielectric units are fluid, then, as shown in FIG. 14, each of the top and bottom ends of the second-type dielectric units 27, 28, 29 35, 36 and 37 is to be separated from the background dielectric 16 by a fourth-kind spacer 34. In this case, the structure of the cloaking device would either be one as shown in FIG. 10 but without the third-kind spacers 24 between the first-type dielectric units and the cloaking area 9, or one as shown in FIG. 10 but without the third-kind spacers 24 between the first-type dielectric units and the cloaking area 9 and also without the second-kind spacers 23 while the adjacent first sidewalls and fifth sidewalls contact each other. In the case where the first-type dielectric units are fluid and the second-type dielectric units are solid, then, as shown in FIG. 12, each of the top and bottom ends of the first-type dielectric units 3, 4, 5, 6, 7 and 8 is to be separated from the background dielectric 16 by a fourth-kind spacer 34. In this case, the structure of the cloaking device would either be one as shown in FIG. 10 but without the first-kind spacers 22 and also without the third-kind spacers 24 between the second-type dielectric units and the cloaking area 9, or as one shown in FIG. 10 but without the first-kind spacers 22, the second-kind spacers 23, and also without the third-kind spacers 24 between the second-type dielectric units and the cloaking area 9 while the adjacent first sidewalls and fifth sidewalls contact each other. In the case where both the first-type dielectric units and the second-type dielectric units are fluid, then, as shown in FIG. 12 and FIG. 14, each of the top and bottom ends of the first-type dielectric units 3, 4, 5, 6, 7 and 8 is to be separated from the background dielectric 16 by a fourth-kind spacer 34, and each of the top and bottom ends of the second-type dielectric units 27, 28, 29, 35, 36 and 37 is to be separated from the background dielectric 16 by a fourth-kind spacer 34. In this case, the structure of the cloaking device is exactly as shown in FIG. 10.

As shown in FIG. 10, the electromagnetic wave beam 31, incident from the background dielectric 16 in a direction perpendicular to the third sidewall 1 of the first-type dielectric unit 8, will pass through successively the adjacent second-type dielectric unit 27, first-type dielectric unit 3, second-type dielectric unit 28, first-type dielectric 4 and second-type dielectric unit 29 in sequence, and transmit to the background dielectric 16. The trace 31*g* and the trace 31*a* are in the same direction and aligned along the same straight line. In the same manner, all the other beams incident from the background dielectric 16 and parallel to the electromagnetic wave beam 31 will bypass the cloaking area 9 and return to their origin paths when exiting the cloaking device back to the background dielectric 16. The maximum width of shadow L is related to the refractive index of the background dielectric $n_{BG}$, the refractive index of the first-type dielectric units $n_{1st}$, the refractive index of the second-type dielectric units $n_{2nd}$ and the first vertex angle α, satisfying the equations: $n_{BG}>n_{2nd}\geq n_{BG}/1.8$, $n_{1st}>n_{2nd}$ and $$0^\circ < \alpha < 2\arcsin\left(\frac{n_{BG}\sin 30^\circ}{n_{2nd}}\right) - 60^\circ.$$

It follows then that the maximum width of shadow is $L=w_1+7.04\times w_2$. When the thickness of the first-kind spacers w1 and the thickness of the second-kind spacers w2 satisfy $w_1+7.04\times w_2<2A$, the cloaking device can always reduce the shadow area. That is to say, the width of the shadow L from the cloaking device is always smaller than the width of the shadow H from an uncloaked object having the same dimension as the cloaking device, proving that the device is always effective under the condition stated above. Furthermore, the thinner the thicknesses of the first-kind spacers and the second-kind spacers, the smaller the maximum width of the shadow. In the case where either the first-type dielectric units or the second-kind spacer dielectric units are solid, the corresponding first or second-kind spacers are not needed. Moreover, in the case where both the first-type dielectric units and the second-type dielectric units are solid, the cloaking device contains no solid spacer, and thus the width of the shadow L is 0, achieving total cloaking.

It is worthwhile to point out that FIGS. 4, 5, 7, 9 and 10 illustrate effective cloaking of the present disclosure only for the exemplary case where the propagation direction of the electromagnetic wave beams incident from the background dielectric 16 is perpendicular to the third sidewall of the first-type dielectric unit 8. In reality, due to the structural symmetry and the hexagonal cross section, the cloaking device is equally effective in all six directions. Namely, the incident electromagnetic wave beams can strike in a direction perpendicular to any of the six third sidewalls of the cloaking device and still result in the same performance of effective cloaking.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. An electromagnetic wave cloaking device having an outer shape of a polygonal prism and surrounding a cloaking area therewithin, the device comprising:
two or more first-type dielectric units each respectively comprising a first isotropic medium of a first refractive index; and
two or more second-type dielectric units each respectively comprising a second isotropic medium of a second refractive index, the first refractive index greater than the second refractive index,
wherein:
each of the two or more first-type dielectric units is disposed adjacent to two of the two or more second-type dielectric units,
each of the two or more second-type dielectric units is disposed adjacent to two of the two or more first-type dielectric units,
each of the first-type dielectric units has an inner surface facing the cloaking area, the inner surfaces of the first-type dielectric units collectively enclosing the cloaking area,
each of the second-type dielectric units has an outer surface opposing the cloaking area, the outer surfaces of the second-type dielectric units collectively forming the outer shape of the polygonal prism,
the first isotropic medium is either solid or fluid,
the second isotropic medium is either solid or fluid,
the first-type dielectric units and the second-type dielectric units are transparent to an electromagnetic waves incident from a background dielectric encompassing the device, and
the first-type dielectric units and the second-type dielectric units are arranged such that the electromagnetic wave incident from the background dielectric into the cloaking device along one of a plurality of preferred incident directions with respect to the device passes through at least two of the first-type dielectric units and at least two of the second-type dielectric units, refracted only at interfaces between the first-type dielectric units and the second-type dielectric units, before exiting the cloaking device without reaching the cloaking area surrounded therewithin.

2. The device of claim 1, wherein each of the first-type dielectric units is a prism with a cross section in a shape of an isosceles triangle,
the cross section comprising:
a first vertex angle which is a vertex angle of the isosceles triangle;
two first legs which are two equal sides of the isosceles triangle; and
a first base which is a base side of the isosceles triangle; and
the prism having five surfaces, the five surfaces comprising:
a top end;
a bottom end;
two first sidewalls, each of the two first sidewalls having a respective one of the two first legs located thereon; and
a third sidewall on which the first base is located, the third sidewall being the inner surface.

3. The device of claim 2, wherein each of the second-type dielectric units is a prism with a cross section in a shape of an isosceles triangle,
the cross section comprising:
a second vertex angle which is a vertex angle of the isosceles triangle;
two second legs which are two equal sides of the isosceles triangle; and
a second base which is a base side of the isosceles triangle; and
the prism having five surfaces, the five surfaces comprising:
a top end;
a bottom end;
two second sidewalls, each of the two second sidewalls having a respective one of the two second legs located thereon; and
a fourth sidewall on which the second base is located, the fourth sidewall being the outer surface,
and wherein:
each second-type dielectric unit is arranged between two first-type dielectric units, and vice versa, with each pair of adjacent second sidewall and first sidewall opposing each other, each third sidewall facing the cloaking area, and each fourth sidewall facing the background dielectric.

4. The device of claim 3, further comprising:
a plurality of second-kind spacers, wherein each of the plurality of second-kind spacers separates a respective pair of opposing second sidewall and first sidewall, and is configured to provide a displacement to the electromagnetic wave.

5. The device of claim 3, further comprising:
a plurality of first-kind spacers, wherein each of the plurality of first-kind spacers separates a respective one of the fourth sidewalls from the background dielectric, and is configured to provide a displacement to the electromagnetic wave;
a first plurality of fourth-kind spacers, wherein each of the first plurality of fourth-kind spacers separates the top end of a respective one of the second-type dielectric units from the background dielectric; and
a second plurality of fourth-kind spacers, wherein each of the second plurality of fourth-kind spacers separates the bottom end of a respective one of the second-type dielectric units from the background dielectric.

6. The device of claim 5, further comprising:
a plurality of second-kind spacers, wherein each of the plurality of second-kind spacers separates a respective pair of opposing second sidewall and first sidewall, and is configured to provide a displacement to the electromagnetic wave.

7. The device of claim 6, wherein:
the device comprises six first-type dielectric units and six second-type dielectric units,
a thickness of each first-kind spacer and a thickness of each second-kind spacer and a length of each first base substantially satisfy equation (1):

$$w_1+7.04\times w_2<2A \quad (1), \text{ and}$$

wherein
the second refractive index and a refractive index of the background dielectric substantially satisfy equation (2):

$$n_{BG}>n_{2nd}\geq n_{BG}/1.8 \quad (2),$$

wherein $w_1$ represents the thickness of each first-kind spacer, $w_2$ represents the thickness of each second-kind spacer, A represents the length of each first base, $n_B$, represents the refractive index of the background dielectric, and $n_{2nd}$ represents the second refractive index.

8. The device of claim 3, further comprising:

a plurality of third-kind spacers, wherein each of the plurality of third-kind spacers separates a respective one of the third sidewalls from the cloaking area;

a first plurality of fourth-kind spacers, wherein each of the first plurality of fourth-kind spacers separates the top end of a respective one of the first-type dielectric units from the background dielectric; and a second plurality of fourth-kind spacers, wherein each of the second plurality of fourth-kind spacers separates the bottom end of a respective one of the first-type dielectric units from the background dielectric.

9. The device of claim 8, further comprising:

a plurality of second-kind spacers, wherein each of the plurality of second-kind spacers separates a respective pair of opposing second sidewall and first sidewall, and is configured to provide a displacement to the electromagnetic wave.

10. The device of claim 9, further comprising:

a plurality of first-kind spacers, wherein each of the plurality of first-kind spacers separates a respective one of the fourth sidewalls from the background dielectric, and is configured to provide a displacement to the electromagnetic wave;

a third plurality of fourth-kind spacers, wherein each of the third plurality of fourth-kind spacers separates the top end of a respective one of the second-type dielectric units from the background dielectric; and a fourth plurality of fourth-kind spacers, wherein each of the fourth plurality of fourth-kind spacers separates the bottom end of a respective one of the second-type dielectric units from the background dielectric.

11. The device of claim 3, wherein:

the device comprises six first-type dielectric units and six second-type dielectric units, and wherein the plurality of preferred incident directions comprises directions perpendicular to the third sidewalls.

12. The device of claim 3, wherein the first refractive index, the second refractive index, a refractive index of the background dielectric, the first vertex angle, the second vertex angle, a length of the first base and a length of the second base further substantially satisfy equations (1) to (6):

$$n_{1st}\sin\left(\arcsin\left(\frac{n_{2nd}\sin\left(60^\circ - \arcsin\left(\frac{n_{BG}\sin 30^\circ}{n_{2nd}}\right) - \alpha/2\right)}{n_{1st}}\right) + \alpha\right) = n_{2nd}\sin(30^\circ + \alpha/2), \tag{1}$$

$$0^\circ < \alpha < 2\arcsin\left(\frac{n_{BG}\sin 30^\circ}{n_{2nd}}\right) - 60^\circ, \tag{2}$$

$$\beta = 60^\circ + \alpha, \tag{3}$$

$$\frac{\sin(30^\circ + \alpha/2)}{\sin(\alpha/2)} = \frac{B}{A} \le U \times V, \tag{4}$$

$$U = \frac{\sin\left[90^\circ - \arcsin\left(\frac{n_{2nd}\sin\left(60^\circ - \arcsin\left(\frac{n_{BG}\sin 30^\circ}{n_{2nd}}\right) - \alpha/2\right)}{n_{1st}}\right) - \alpha\right]}{\sin\left[90^\circ + \arcsin\left(\frac{n_{2nd}\sin\left(60^\circ - \arcsin\left(\frac{n_{BG}\sin 30^\circ}{n_{2nd}}\right) - \alpha/2\right)}{n_{1st}}\right)\right]}, \tag{5}$$

-continued $$V = \frac{\sin\left[30^\circ + \arcsin\left(\frac{n_{BG}\sin 30^\circ}{n_{2nd}}\right) + \alpha/2\right]}{2\sin(\alpha/2)\sin\left[90^\circ - \arcsin\left(\frac{n_{BG}\sin 30^\circ}{n_{2nd}}\right)\right]}, \tag{6}$$

wherein $n_{1st}$ represents the first refractive index, $n_{2nd}$ represents the second refractive index, $n_{BG}$ represents the refractive index of the background dielectric, α represents the first vertex angle, β represents the second vertex angle, A represents the length of the first base, and B represents the length of the second base.

13. The device of claim 2, wherein each of the second-type dielectric units is a prism with a cross section in a shape of an isosceles trapezoid, the cross section comprising:

a third angle which is an angle between extensions of two equal sides of the isosceles trapezoid;

two third legs which are the two equal sides of the isosceles trapezoid;

a third base which is a lower base of the isosceles trapezoid; and a fourth base which is an upper base of the isosceles trapezoid; and the prism having six surfaces, the six surfaces comprising:

a top end;

a bottom end;

two fifth sidewalls, each of the two fifth sidewalls having a respective one of the two third legs located thereon;

a sixth sidewall on which the third base is located, the sixth sidewall being the outer surface; and a seventh sidewall on which the fourth base is located, and wherein:

each second-type dielectric unit is arranged between two first-type dielectric units, and vice versa, with each pair of adjacent fifth sidewall and first sidewall opposing each other, each third sidewall and each seventh sidewall facing the cloaking area, and each sixth sidewall facing the background dielectric.

14. The device of claim 13, further comprising:

a plurality of second-kind spacers, wherein each of the plurality of second-kind spacers separates a respective pair of opposing fifth sidewall and first sidewall, and is configured to provide a displacement to the electromagnetic wave.

15. The device of claim 13, further comprising:

a plurality of first-kind spacers, wherein each of the plurality of first-kind spacers separates a respective one of the sixth sidewalls from the background dielectric, and is configured to provide a displacement to the electromagnetic wave;

a plurality of third-kind spacers, wherein each of the plurality of third-kind spacers separates a respective one of the seventh sidewalls from the cloaking area;

a first plurality of fourth-kind spacers, wherein each of the first plurality of fourth-kind spacers separates the top end of a respective one of the second-type dielectric units from the background dielectric; and a second plurality of fourth-kind spacers, wherein each of the second plurality of fourth-kind spacers separates the bottom end of a respective one of the second-type dielectric units from the background dielectric.

16. The device of claim 15, further comprising:

a plurality of second-kind spacers, wherein each of the plurality of second-kind spacers separates a respective pair of opposing fifth sidewall and first sidewall, and is configured to provide a displacement to the electromagnetic wave.

17. The device of claim 13, further comprising:

a plurality of third-kind spacers, wherein each of the plurality of third-kind spacers separates a respective one of the third sidewalls from the cloaking area;

a first plurality of fourth-kind spacers, wherein each of the first plurality of fourth-kind spacers separates the top end of a respective one of the first-type dielectric units from the background dielectric; and a second plurality of fourth-kind spacers, wherein each of the second plurality of fourth-kind spacers separates the bottom end of a respective one of the first-type dielectric units from the background dielectric.

18. The device of claim 17, further comprising:

a plurality of second-kind spacers, wherein each of the plurality of second-kind spacers separates a respective pair of opposing fifth sidewall and first sidewall, and is configured to provide a displacement to the electromagnetic wave.

19. The device of claim 18, further comprising:

a plurality of first-kind spacers, wherein each of the plurality of first-kind spacers separates a respective one of the sixth sidewalls from the background dielectric, and is configured to provide a displacement to the electromagnetic wave;

a plurality of third-kind spacers, each of the plurality of third-kind spacers separates a respective one of the seventh sidewalls from the cloaking area;

a third plurality of fourth-kind spacers, each of the third plurality of fourth-kind spacers separates the top end of a respective one of the second-type dielectric units from the background dielectric; and a fourth plurality of fourth-kind spacers, each of the fourth plurality of fourth-kind spacers separates the bottom end of each second-type dielectric unit from the background dielectric.

20. The device of claim 13, wherein the first refractive index, the second refractive index, a refractive index of the background dielectric, the first vertex angle, the third angle, a length of the first base and a length of the third base further substantially satisfy equations (1)-(6) as follows:

$$n_{1st}\sin\left[\arcsin\left(\frac{n_{2nd}\sin\left(60^\circ - \arcsin\left(\frac{n_{BG}\sin 30^\circ}{n_{2nd}}\right) - \alpha/2\right)}{n_{1st}}\right) + \alpha\right] = n_{2nd}\sin(30^\circ + \alpha/2), \tag{1}$$

$$0^\circ < \alpha < 2\arcsin\left(\frac{n_{BG}\sin 30^\circ}{n_{2nd}}\right) - 60^\circ, \tag{2}$$

$$U = \frac{\sin\left[90^\circ - \arcsin\left(\frac{n_{2nd}\sin\left(60^\circ - \arcsin\left(\frac{n_{BG}\sin 30^\circ}{n_{2nd}}\right) - \alpha/2\right)}{n_{1st}}\right) - \alpha\right]}{\sin\left[90^\circ + \arcsin\left(\frac{n_{2nd}\sin\left(60^\circ - \arcsin\left(\frac{n_{BG}\sin 30^\circ}{n_{2nd}}\right) - \alpha/2\right)}{n_{1st}}\right)\right]}, \tag{3}$$

$$V = \frac{\sin\left[30^\circ + \arcsin\left(\frac{n_{BG}\sin 30^\circ}{n_{2nd}}\right) + \alpha/2\right]}{2\sin(\alpha/2)\sin\left[90^\circ - \arcsin\left(\frac{n_{BG}\sin 30^\circ}{n_{2nd}}\right)\right]}, \tag{4}$$

$$\gamma = 60^\circ + \alpha, \text{ and} \tag{5}$$

$$\frac{\sin(30^\circ + \alpha/2)}{\sin(\alpha/2)} \leq \frac{C}{A} \leq U \times V, \tag{6}$$

wherein $n_{1st}$ represents the first refractive index, $n_{2nd}$ represents the second refractive index, $n_{BG}$ represents the refractive index of the background dielectric, α represents the first vertex angle, γ represents the third angle, A represents the length of the first base, and C represents the length of the third base.

* * * * *